United States Patent
Fukumori et al.

(10) Patent No.: US 11,105,647 B2
(45) Date of Patent: Aug. 31, 2021

(54) INFORMATION ANALYSIS DEVICE AND PATH INFORMATION ANALYSIS METHOD

(71) Applicant: HONDA MOTOR CO., LTD., Tokyo (JP)

(72) Inventors: Minoru Fukumori, Tokyo (JP); Shunsuke Kawasaki, Tokyo (JP); Tadashi Kurihara, Tokyo (JP); Yoshiaki Sugimoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/493,416

(22) PCT Filed: Feb. 21, 2018

(86) PCT No.: PCT/JP2018/006241
§ 371 (c)(1),
(2) Date: Sep. 12, 2019

(87) PCT Pub. No.: WO2018/168365
PCT Pub. Date: Sep. 20, 2018

(65) Prior Publication Data
US 2020/0132493 A1 Apr. 30, 2020

(30) Foreign Application Priority Data
Mar. 15, 2017 (JP) .............................. JP2017-049708

(51) Int. Cl.
*G01C 21/36* (2006.01)
*G01C 21/34* (2006.01)
*G08G 1/0968* (2006.01)

(52) U.S. Cl.
CPC ..... *G01C 21/3617* (2013.01); *G01C 21/3484* (2013.01); *G01C 21/3682* (2013.01); *G08G 1/096827* (2013.01); *G08G 1/096888* (2013.01)

(58) Field of Classification Search
CPC ............ G01C 21/3617; G01C 21/3484; G01C 21/3682; G08G 1/096827; G08G 1/096888
See application file for complete search history.

(56) References Cited

U.S. PATENT DOCUMENTS

2007/0073477 A1* 3/2007 Krumm ................. G01C 21/34
701/423
2014/0129132 A1* 5/2014 Yoshizu ............. G06Q 30/0266
701/400

(Continued)

FOREIGN PATENT DOCUMENTS

CN 103857987 A 6/2014
JP 2005-308542 11/2005

(Continued)

OTHER PUBLICATIONS

International Search Report, dated May 29, 2018 (May 29, 2018), 2 pages.
Chinese Office Action dated Apr. 15, 2020, 10 pages.

*Primary Examiner* — Thomas E Worden
(74) *Attorney, Agent, or Firm* — Rankin, Hill & Clark LLP

(57) ABSTRACT

To statistically analyze information on the path of ra movement of a moving body. An information analysis device includes a communication unit that receives position information for a vehicle, a memory unit that stores map information pertaining to roads over which the vehicle can travel and position information concerning facilities, a visit frequency calculator that calculates the frequency at which the (Continued)

71:FACILITY ICON

74:MESH REGION GROUP DISPLAY, 73:MAP DISPLAY vehicle visits a facility on the basis of facility information concerning the facility, and a travel path specification unit that specifies the vehicle that has made a plurality of visits to the facility on the basis of the results of calculations made by the visit frequency calculator and specifies the travel path to the facility for the specified vehicle from the position information and the map information pertaining to the roads.

5 Claims, 11 Drawing Sheets

(56) References Cited

U.S. PATENT DOCUMENTS

| | | | | |
|---|---|---|---|---|
| 2014/0129139 | A1* | 5/2014 | Ellison | B60L 53/66 |
| | | | | 701/533 |
| 2016/0239024 | A1* | 8/2016 | Fletcher | G06Q 10/00 |
| 2019/0063931 | A1* | 2/2019 | Aoyama | H04W 4/40 |

FOREIGN PATENT DOCUMENTS

| | | |
|---|---|---|
| JP | 2008-064597 | 3/2008 |
| JP | 2010-211000 | 9/2010 |
| JP | 2014-215205 | 11/2014 |
| JP | 2016-038297 | 3/2016 |
| WO | 2014-174648 | 10/2014 |

* cited by examiner

FIG. 5

POSITION INFORMATION DATABASE

| DISCRIMINATION INFORMATION | FACILITY TO BE VISITED | START POSITION | POSITION INFORMATION |
|---|---|---|---|
| abc123 | AAA | ... | ... |
| | AAA | ... | ... |
| | CCC | ... | ... |
| | ⋮ | ⋮ | ⋮ |
| | ZZZ | ... | ... |
| efg456 | AAA | ... | ... |
| | BBB | ... | ... |
| | CCC | ... | ... |
| | ⋮ | ⋮ | ⋮ |
| | YYY | ... | ... |
| ⋮ | ⋮ | ⋮ | ⋮ |
| xyz789 | DDD | ... | ... |
| | DDD | ... | ... |
| | DDD | ... | ... |
| | ⋮ | ⋮ | ⋮ |
| | ZZZ | ... | ... |

INFORMATION ANALYSIS DEVICE AND PATH INFORMATION ANALYSIS METHOD

TECHNICAL FIELD

The present invention relates to an information analysis device and a route information analysis method for carrying out an information analysis with respect to a movement route of a movable body.

BACKGROUND ART

In the related art, a technology has been known in which position information of a movable body such as a vehicle is acquired, and a movement route in which the movable body is actually moved is identified on the basis of a change in the acquired position information.

An example of such a technology, for example, is disclosed in Patent Document 1. In the technology disclosed in Patent Document 1, current position data of the movable body is acquired for each movement distance or each time set in advance. Then, the acquired current position of the movable body or a route in which the movable body has been moved is collated with the position of a road that is represented by the road data, and thus, it is determined whether or not there is a difference therebetween. Then, in a case where there is a difference, it is considered that the movable body is moved on a new road that is not included in the road data, and the new road is added by updating the road data.

Patent Document 1: Japanese Unexamined Patent Application, Publication No. 2014-215205

DISCLOSURE OF THE INVENTION

Problems to be Solved by the Invention

As with the technology disclosed in Patent Document 1, the movement route in which the movable body is actually moved is identified, and thus, it is possible to perform processing on the basis of the identified movement route. However, in the technology disclosed in Patent Document 1, information on the movement route of the movable body is sequentially used, but the information on the movement route of the movable body is not statistically analyzed.

The present invention has been made in consideration of such circumstances, and an object of the present invention is to provide an information analysis device and a route information analysis method in which information on a movement route of a movable body can be statistically analyzed.

Means for Solving the Problems (1) An information analysis device (for example, an information analysis device 30 described below) of the present invention, includes: a receiving unit (for example, a communication unit 33 described below) that receives position information of a movable body; a storage unit (for example, a storage unit 32 described below) that stores information relevant to a road through which the movable body is capable of passing, and information relevant to a facility; a visit frequency calculator (for example, a visit frequency calculator 312 described below) that calculates a visit frequency of the movable body with respect to the facility, on the basis of the position information of the movable body and the information relevant to the facility; and a movement route identification unit (for example, a movement route identification unit 313 described below) that identifies the movable body that visits to the facility a plurality of times, on the basis of a calculation result of the visit frequency calculator, and identifies a movement route to the facility with respect to the identified movable body, from the position information and the information relevant to the road.

According to (1) described above, an effect is obtained in which the position information is collected, and the collected position information is statistically analyzed in accordance with a predetermined condition, and thus, analysis information can be generated. In particular, the collected position information is statistically analyzed with respect to the movable body satisfying a condition of "visiting to the facility a plurality of times", and thus, the analysis information can be generated. Accordingly, it is known from which direction the movable body visiting to the facility many times comes.

(2) Another information analysis device (for example, the information analysis device 30 described below) of the present invention, includes: a receiving unit (for example, the communication unit 33 described below) that receives position information of a movable body; a storage unit (for example, the storage unit 32 described below) that stores information relevant to a road through which the movable body is passing, and information relevant to a facility; a visit frequency calculator (for example, the visit frequency calculator 312 described below) that calculates a visit frequency of the movable body with respect to the facility, on the basis of the position information of the movable body and the information relevant to the facility; and a movement route identification unit (for example, the movement route identification unit 313 described below) that identifies the movable body of which a visit frequency with respect to the facility is less than or equal to a predetermined number of times, on the basis of a calculation result of the visit frequency calculator, and identifies a movement route to the facility with respect to the identified movable body, from the position information and the information relevant to the road.

According to (2) described above, an effect is obtained in which the position information is collected, the collected position information is statistically analyzed in accordance with a predetermined condition, and thus, the analysis information can be generated. In particular, the collected position information is statistically analyzed with respect to the movable body satisfying a condition of "the visit frequency with respect to the facility of less than or equal to a predetermined number of times", and thus, the analysis information can be generated. Accordingly, it is also known from which direction the movable body visiting to the facility less than or equal to the predetermined number of times (for example, only once) comes.

(3) In the information analysis device according to (1) or (2) described above, the movement route identification unit may further identify a start position of the movable body, on the basis of the position information of the movable body, determine whether or not the identified start position exists in a predetermined range from the facility, on the basis of the identified start position and the information relevant to the facility, and identify the movement route of the movable body to the facility by dividing the movement route into an in-predetermined range and an out-of-predetermined range.

According to (3) described above, an effect is obtained in which it is possible to acquire the analysis information obtained by identifying the movement route of the movable body to the facility in accordance with whether the start position exists in the predetermined range from the facility, in addition to the effects obtained by (1) or (2) described above. Accordingly, an effect is also obtained in which it is known from which direction the movable body visiting to the facility many times comes, or on the contrary, from which direction the movable body visiting to the facility only once comes.

(4) In the information analysis device according to any one of (1) to (3) described above, the storage unit may further store map information that is managed in a mesh-like predetermined region, and the movement route identification unit may further determine whether or not the movement route of the identified movable body to the facility is included in the mesh-like predetermined region for each mesh-like predetermined region, and output the movement route to be visible in accordance with the number of times in which the movement route to the facility is included in the mesh-like predetermined region.

According to (4) described above, an effect is obtained in which it is possible to know information indicating which movable body having which movement route in which mesh-like region are many (or few). Accordingly, for example, in a case where the facility is a store, it is possible to use the analysis information for determining which position in which direction is effective for providing a name-board, or which position is suitable for a parking lot.

(5) An information analysis method of the present invention is an information analysis method performed by an information analysis device (for example, the information analysis device 30 described below), and includes: a receiving step of receiving position information of a movable body; a storing step of storing information relevant to a road through which the movable body is capable of passing, and information relevant to a facility; a visit frequency calculating step of calculating a visit frequency of the movable body with respect to the facility, on the basis of the position information of the movable body and the information relevant to the facility; and a movement route identifying step of identifying the movable body that visits to the facility a plurality of times, on the basis of a calculation result of the visit frequency calculating step, and of identifying a movement route to the facility with respect to the identified movable body, from the position information and the information relevant to the road.

According to the method of (5) described above, the same effects as those of the information analysis device of (1) are obtained.

(6) Another information analysis method of the present invention is an information analysis method performed by an information analysis device (for example, the information analysis device 30 described below), and includes: a receiving step of receiving position information of a movable body; a storing step of storing information relevant to a road through which the movable body is capable of passing, and information relevant to a facility; a visit frequency calculating step of calculating a visit frequency of the movable body with respect to the facility, on the basis of the position information of the movable body and the information relevant to the facility; and a movement route identifying step of identifying the movable body of which a visit frequency with respect to the facility is less than or equal to a predetermined number of times, on the basis of a calculation result of the visit frequency calculating step, and of identifying a movement route to the facility with respect to the identified movable body, from the position information and the information relevant to the road.

According to the method of (6) described above, the same effects as those of the information analysis device of (2) are obtained.

Effects of the Invention

According to the present invention, it is possible to statistically analyze information on a movement route of a movable body.

BRIEF DESCRIPTION OF THE DRAWINGS

FIG. 5 is a diagram illustrating an example of a position information database in the embodiment of the present invention.

PREFERRED MODE FOR CARRYING OUT THE INVENTION

Hereinafter, a preferred embodiment of an information analysis system of the present invention will be described in detail with reference to the drawings.

<Entire Configuration of Information Analysis System 1>

Figure 1:
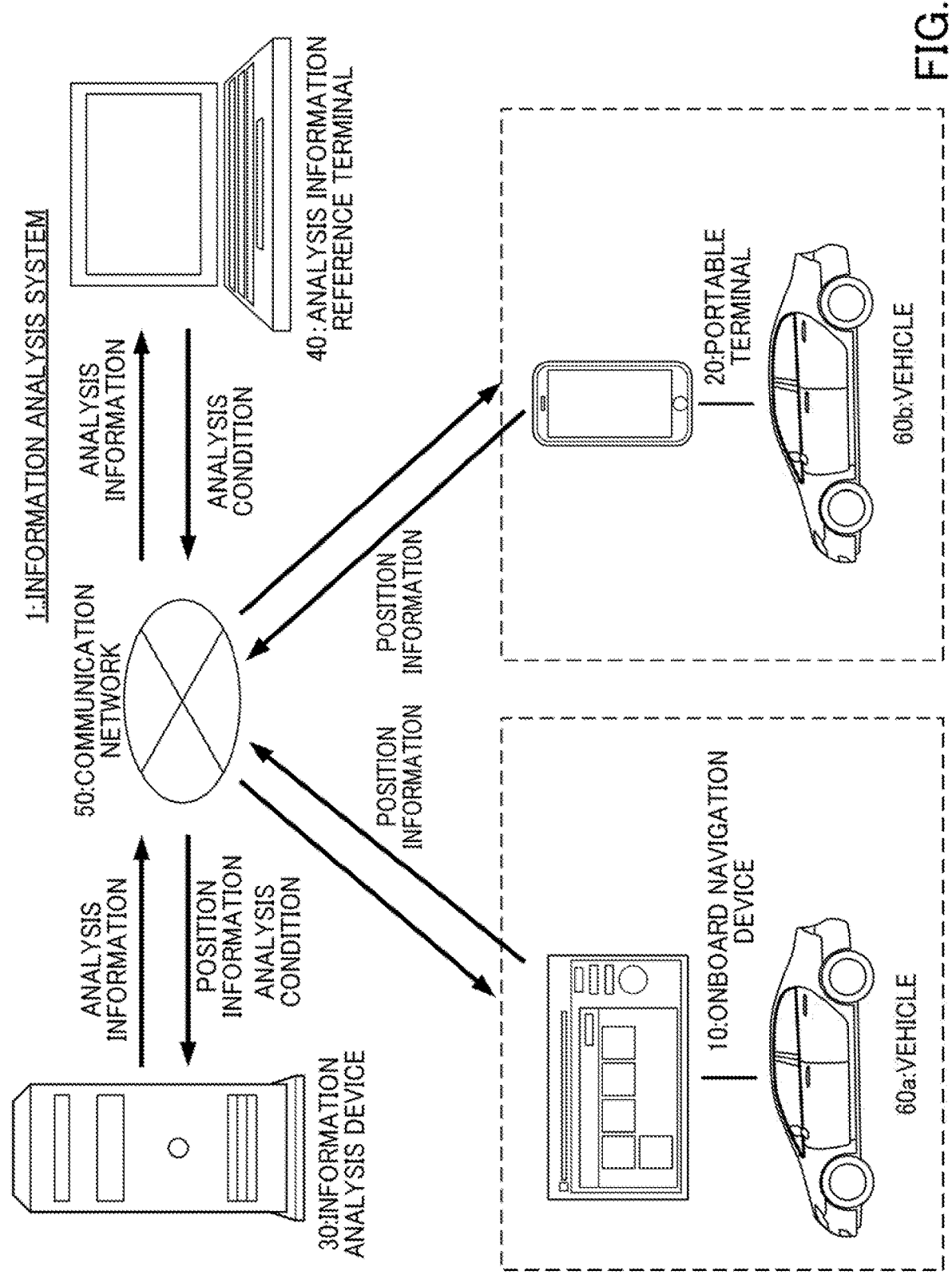
FIG. 1 is a block diagram illustrating a basic configuration of the entire information analysis system that is an embodiment of the present invention.

An information analysis system 1 according to a preferred embodiment of the present invention will be described. FIG. 1 illustrates the entire configuration of the information analysis system 1.

As illustrated in FIG. 1, the information analysis system 1 is configured by including an onboard navigation device 10, a portable terminal 20, an information analysis device 30, and an analysis information reference terminal 40. Each device and each terminal can be connected to communicate with each other through a communication network 50. Furthermore, in the drawing, information that is transmitted and received with respect to each device and each terminal is illustrated, but such information is merely an example. In this embodiment, information other than the illustrated information may be transmitted and received.

The onboard navigation device 10 is a device performing navigation (route guidance) with respect to a user in a vehicle 60*a*. The onboard navigation device 10 performs the route guidance from a current position to a destination, on the basis of the request of the user. In addition, the onboard navigation device 10 also has a function of positioning position information of the onboard navigation device 10 (that is, position information of the vehicle 60*a*). The position information that is positioned by the onboard navigation device 10 is suitably transmitted to the information analysis device 30. The onboard navigation device 10 can be realized by a car navigation device transportable by being fixed to the vehicle 60*a* that is a movable body, or a portable navigation device (PND) simply disposed on the vehicle 60*a* that is the movable body.

The portable terminal 20 is a portable terminal used by the user in a vehicle 60*b*. As with the onboard navigation device 10 described above, the portable terminal 20 has a function of positioning position information of the portable terminal 20 (that is, position information of the vehicle 60*b*). As with the position information that is positioned by the onboard navigation device 10, the position information that is positioned by the portable terminal 20 is suitably transmitted to the information analysis device 30. The portable terminal 20 can be realized by a smart phone, a portable telephone, a tablet terminal, a laptop computer, and other portable electronic devices.

Furthermore, in the drawing, a combination of the onboard navigation device 10 and the vehicle 60*a,* and a combination of the portable terminal 20 and the vehicle 60*b* are illustrated one by one, but the number of such combinations is not particularly limited. In addition, in the following description, in the case of not distinguishing the vehicle 60*a* on which the onboard navigation device 10 is mounted, from the vehicle 60*b* in which the user using the portable terminal 20 exists, the suffix alphabet will be omitted, and the vehicles 60*a* and 60*b* will be simply referred to as a "vehicle 60".

The information analysis device 30 is a device carrying out analysis processing of route information that is unique processing of this embodiment. The information analysis device 30 acquires the position information of each of the vehicles 60 from the onboard navigation device 10 or the portable terminal 20, and thus, prepares a position information database that is a database with respect to the position information of each of the vehicles 60. Then, the information analysis device 30 statistically analyzes the prepared position information database, and thus, identifies the movement route with respect to each of the vehicles 60.

In addition, the information analysis device 30 generates "analysis information" on the basis of the identified movement route. The generated analysis information is transmitted to the analysis information reference terminal 40 from the information analysis device 30, and is output with respect to the user. Furthermore, the analysis information is generated to be coincident with an "analysis condition" that is transmitted by the analysis information reference terminal 40 on the basis of the input of the user. The details of the analysis information or the analysis condition will be described below. The information analysis device 30, for example, can be realized by a server device.

The analysis information reference terminal 40 is a terminal which is operated by the user using the analysis information. The user using the analysis information inputs a desired analysis condition with respect to the analysis information reference terminal 40, in order to obtain the analysis information according to a desired condition. The input analysis condition is transmitted to the information analysis device 30. In this case, as described above, the information analysis device 30 generates the analysis information corresponding to the analysis condition, and sends a reply with respect to the analysis information reference terminal 40. Then, the analysis information reference terminal 40 outputs the received analysis information with respect to the user using the analysis information.

As described above, the user of the analysis information reference terminal 40 is capable of obtaining the analysis information according to a desired condition. Then, the user, for example, is capable of knowing through which movement route a customer visits to a certain facility, or the like, on the basis of the analysis information. That is, according to this embodiment, it is possible to statistically analyze the information on the movement route of the movable body. Furthermore, the analysis information reference terminal 40, for example, can be realized by a personal computer.

The communication network 50 is realized by a network such as the internet or a portable telephone network, and a network such as a combination thereof. In addition, a local area network (LAN) may be included in a part of the network (for example, between the information analysis device 30 and the analysis information reference terminal 40).

The vehicle 60 is a movable body in which the onboard navigation device 10 or the user of the portable terminal 20 exists. The vehicle 60, for example, is realized by a four-wheel vehicle, a motorcycle, a bicycle, or the like.

<Functional Block of Onboard Navigation Device 10>

Next, a functional block of the onboard navigation device 10 will be described with reference to a block diagram of FIG. 2. Here, a power source is supplied from the vehicle 60*a*, and an ignition-switch-on state of the vehicle 60*a* is set by the user in the vehicle 60*a* (an engine is started), and thus, the onboard navigation device 10 is automatically activated. Then, the onboard navigation device 10 is operated until an ignition-switch-off state of the vehicle 60*a* is set by the user in the vehicle 60*a* (the engine is suspended).

Figure 2:
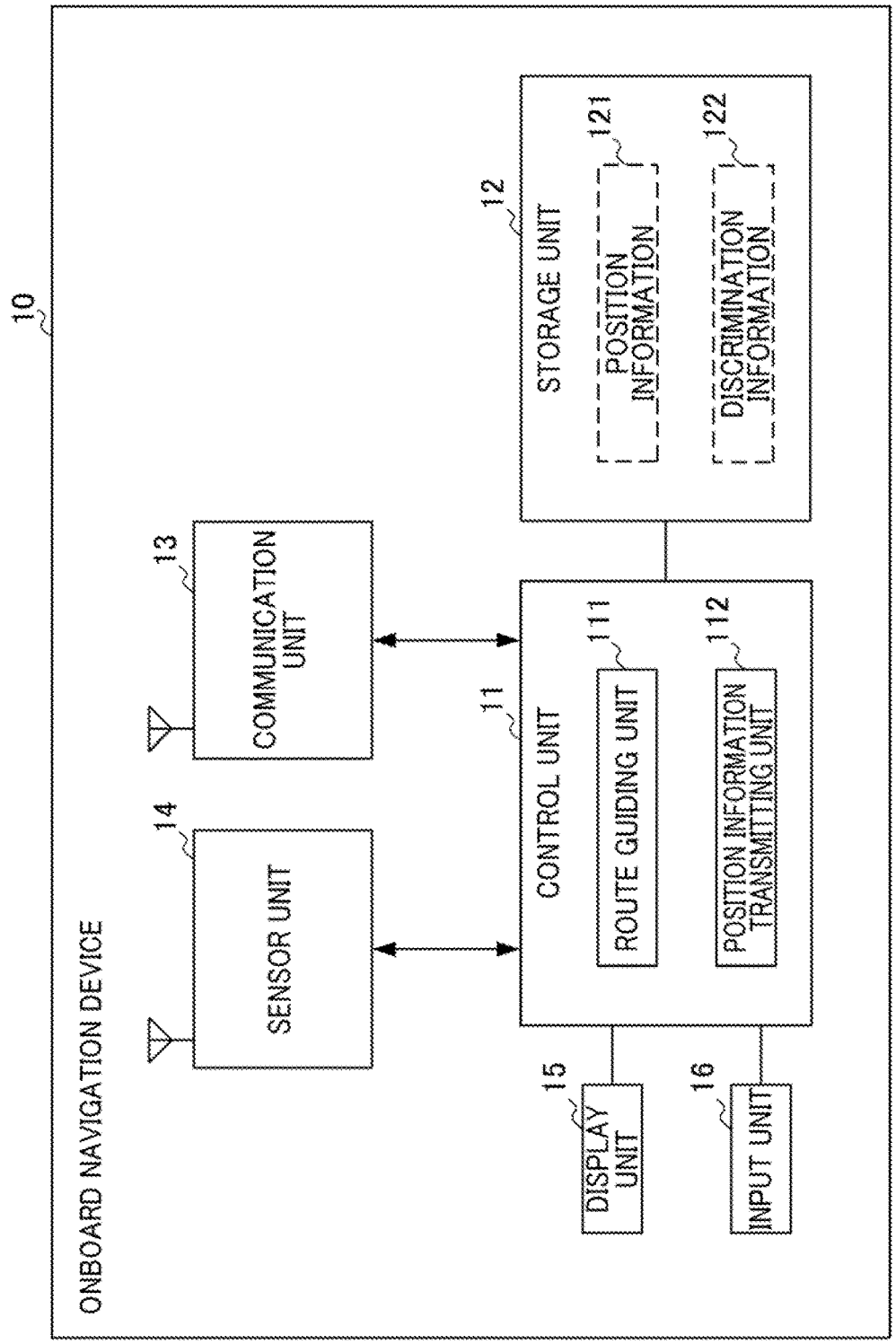
FIG. 2 is a functional block diagram illustrating a functional configuration of an onboard navigation device in the embodiment of the present invention.

As illustrated in FIG. 2, the onboard navigation device 10 is configured by including a control unit 11, a storage unit 12, a communication unit 13, a sensor unit 14, a display unit 15, and an input unit 16.

The control unit 11 is configured of an arithmetic processing device such as a microprocessor, and controls each unit configuring the onboard navigation device 10. The details of the control unit 11 will be described below.

The storage unit 12 is configured of a semiconductor memory or the like, and stores each program such as a control program referred to as firmware or an operating system, a program for performing route guidance processing, and a program for performing transmission processing of the position information with respect to the information analysis device 30, and various information items such as the map information. In the drawing, position information 121 and discrimination information 122 that are information particularly relevant to the transmission processing of the position information, are illustrated as the information stored in the storage unit 12.

The position information 121 is the position information of the onboard navigation device 10 (that is, the position information of the vehicle 60*a*) that is positioned by the sensor unit 14 described below. The position information 121 may include not only information indicating a position that is positioned, but also a time when the positioning is performed. In addition, the discrimination information 122 is information for discriminating the onboard navigation device 10. For example, a production number or the like that is uniquely assigned to the onboard navigation device 10 can be used as the discrimination information 122. In addition, in order for the communication unit 13 to be connected to the communication network 50 that is a network, such as a portable telephone network, a telephone number applied to a subscriber identity module (SIM) inserted into the communication unit 13 can be used as the discrimination information 122. In addition, a vehicle identification number (VIN) or a number of a number plate that is intrinsically applied to the vehicle 60a can be used as the discrimination information 122.

Each of the information items stored in the storage unit 12 may be stored in advance in the storage unit 12, or may be suitably downloaded from a server device or the like (not illustrated) that is connected to the communication network 50, as necessary. Further, the information may be suitably corrected in accordance with the input of the user, or the like.

The communication unit 13 includes a digital signal processor (DSP) or the like, and realizes wireless communication with respect to other devices via the communication network 50 (for example, the information analysis device 30) through the communication network 50, on the basis of a standard such as 3rd generation (3G), long term evolution (LTE), and Wi-Fi (registered trademark). The communication unit 13, for example, is used for a position information transmitting unit 112 described below to transmit the position information 121 and the discrimination information 122 that are stored in the storage unit 12 to the information analysis device 30. However, data that is transmitted and received between the communication unit 13 and the other device is not particularly limited, and information other than the position information 121 and the discrimination information 122 may be transmitted and received.

The sensor unit 14, for example, is configured of a global positioning system (GPS) sensor, a gyro sensor, an acceleration sensor, and the like. The sensor unit 14 has a function as a position detection unit that detects the position information, receives a GPS satellite signal from a GPS sensor, and positions the position information (a latitude and a longitude) of the onboard navigation device 10. The positioning of the sensor unit 14 is performed at a predetermined time interval (for example, a three-seconds interval) as described above. The position information that is positioned is stored in the storage unit 12 as the position information 121. Furthermore, in the sensor unit 14, it is possible to further increase a positioning accuracy of the position information of the onboard navigation device 10 on the basis of an angular rate or an acceleration rate that is measured by a gyro sensor and an acceleration sensor. In addition, in a case where it is difficult to or it is not possible to perform GPS communication, the sensor unit 14 is also capable of calculating the position information of the onboard navigation device 10 by base station information that is acquired from the communication unit 13, by using assisted global positioning system (AGPS) communication.

The display unit 15 is configured of a display device such as a liquid crystal display or an organic electroluminescence panel. The display unit 15 receives an instruction from the control unit 11, and displays an image. Examples of the information displayed on the display unit 15 include the current position of the onboard navigation device 10, map information of the vicinity of the current position of the onboard navigation device 10 that is read out from the map information, a destination that is set by the user, meeting information that is notified from the other onboard navigation device 10, route information, various user interfaces, and the like.

The input unit 16 is configured of an input device (not illustrated) such as a physical switch referred to as a numeric keypad or a touch panel that is disposed by being overlaid with a display surface of the display unit 15, and the like. A signal based on operation input from the input unit 16, such as the press of the numeric keypad of a user and the touch of the touch panel, is output to the control unit 11, and thus, a selection operation of the user and a scaling operation of a map can be realized.

Furthermore, even though it is not illustrated, a speaker, a microphone, or the like can be provided. The speaker outputs sound with respect to a driver, and the microphone collects a sound generated by the driver. As described above, information can be output from the speaker as a sound, or various selections or instructions of the driver to whom a sound is input through the microphone can be input into the control unit 11 by a sound recognition technology.

Next, the details of the control unit 11 will be described. The control unit 11 is configured of a microprocessor including a central processing unit (CPU), a random access memory (RAM), a read only memory (ROM), input/output (I/O), and the like. The CPU executes each program that is read out from the ROM or the storage unit 12, reads out the information from the RAM, the ROM, and the storage unit 12 when the program is executed, and writes the information with respect to the RAM and the storage unit 12, and thus, performs the delivery of the signal with respect to the communication unit 13, the sensor unit 14, the display unit 15, and the input unit 16. Then, hardware and software (a program) cooperate with each other, and thus, the processing of this embodiment is realized.

The control unit 11 includes a route guiding unit 111 and a position information transmitting unit 112, as a functional block.

The route guiding unit 111 is a portion performing route guidance processing up to the destination such as a facility that is input or selected by the user. The route guidance processing up to the destination is identical to the route guidance processing in a general car navigation system. That is, the route guiding unit 111 generates a map up to the destination, on the basis of the map information (not illustrated) that is stored in the storage unit 12, overlays the current position of the onboard navigation device 10 that is positioned by the sensor unit 14, the position of the destination, and the route information up to the destination on the map, and displays the information on the display unit 15, and thus, is capable of performing the route guidance. In this case, a sound for route guidance may be further output from the speaker (not illustrated). In addition, information of a road congestion situation, weather information, or the like may be acquired through the communication of the communication unit 13, and the acquired information may be used for the route guidance processing. Furthermore, the route guidance processing up to the destination is well known for a person skilled in the art, and thus, the detailed description thereof will be omitted.

The position information transmitting unit 112 is a portion transmitting the position information 121 and the discrimination information 122 that are stored in the storage unit 12 with respect to the information analysis device 30, through wireless communication using the communication unit 13. The transmission of the position information 121 and the discrimination information 122 with respect to the information analysis device 30 by the position information transmitting unit 112 is periodically performed after the ignition-switch-on state of the vehicle 60a is set (the engine is started) by the user in the vehicle 60a, and the onboard navigation device 10 is automatically activated, until the ignition-switch-off state of the vehicle 60a is set (the engine is suspended). For example, every time when the sensor unit 14 performs the positioning at a predetermined time interval (for example, a three-seconds interval), the information is transmitted in real time. In addition, a plurality of information items (for example, the position information 121 and the discrimination information 122 that are updated at a three-seconds interval for 3 minutes) may be transmitted at one time, instead of performing the transmission with respect to the information analysis device 30 in real time. That is, so-called burst transmission may be performed. The length of the predetermined time interval, and the real-time transmission or the burst transmission can be arbitrarily set in accordance with an environment or the like to which the present embodiment is applied. As described above, the real-time transmission or the burst transmission is performed, and thus, the position information transmitting unit 112 transmits the position information 121 and the discrimination information 122 for identifying the movement route of the vehicle 60a that is positioned by the sensor unit 14, with respect to the information analysis device 30.

In this case, the ignition-switch-on state is set (the engine is started), and a position identified by the position information 121 that is positioned immediately after the onboard navigation device 10 is automatically activated can be transmitted to the information analysis device 30, as an initial vehicle position, that is, a start position. Further, a position identified by the position information 121 that is positioned immediately before the ignition-switch-off state is set (the engine is suspended) can be transmitted to the information analysis device 30, as a final vehicle position, that is, a parking position. In this case, the information that is the position information 121 indicating the start position, or the position information 121 indicating the stop position (for example, a flag indicating such information is set to 1) may be added to the position information 121, and then, may be transmitted to the information analysis device 30. Furthermore, the position information 121 (that is, a stop position) that is positioned immediately before the ignition-switch-off state is set (the engine is suspended) may be transmitted when the ignition-switch-on state is set (the engine is started), and the onboard navigation device 10 is activated again.

In addition, even in the case of performing the burst transmission, in a case where it is determined that the vehicle 60a arrives at the destination such as the facility by the route guiding unit 111, the position information transmitting unit 112 may be switched to perform the real-time transmission. Accordingly, it is possible to prevent the position information 121 of the destination such as the facility from not being transmitted with respect to the information analysis device 30 due to the setting of the ignition-switch-off state (the suspension of the engine) after arriving at the destination such as the facility and before transmitting the position information 121 of the destination such as the facility.

<Functional Block of Portable Terminal 20>

Figure 3:
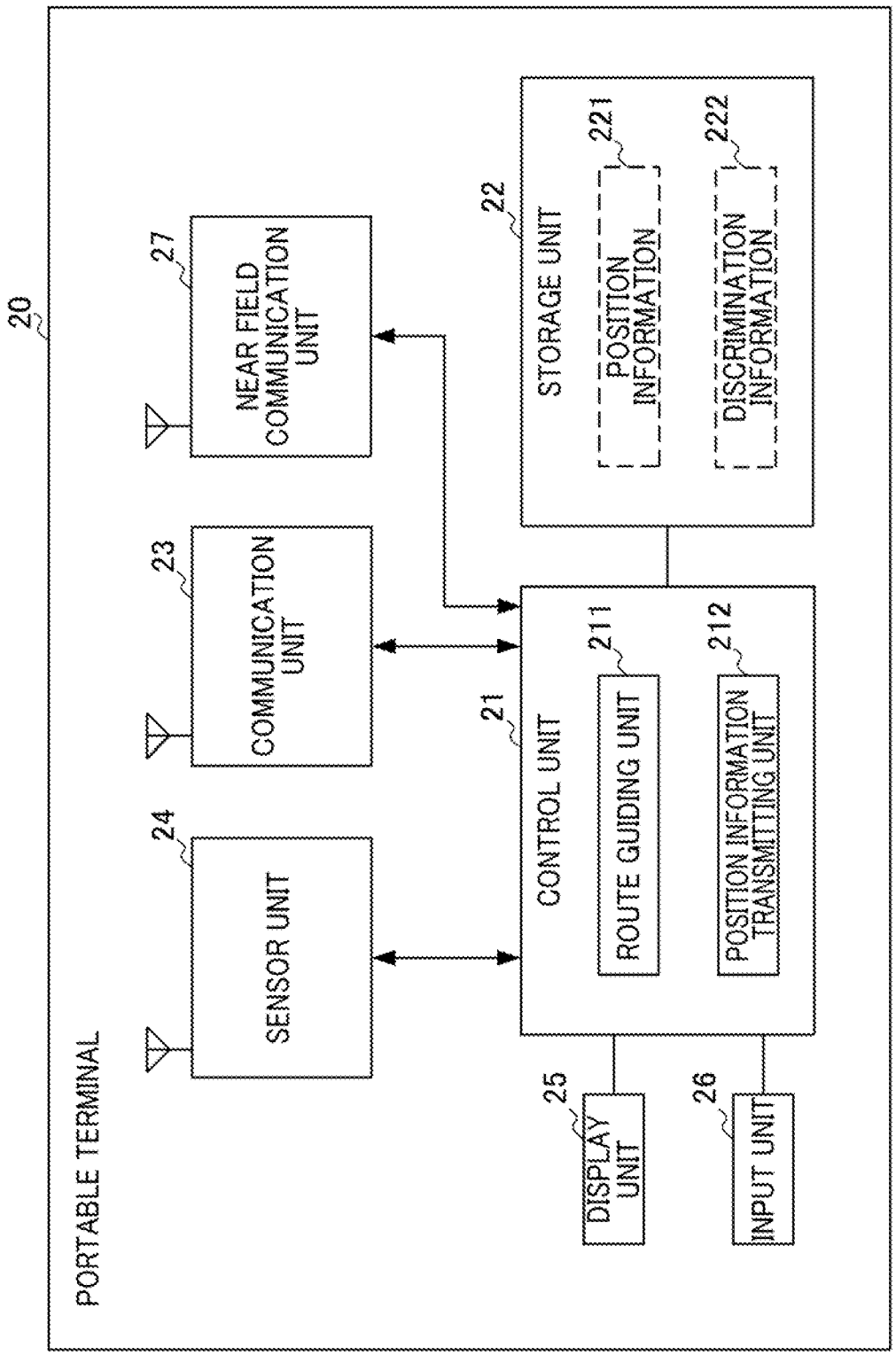
FIG. 3 is a functional block diagram illustrating a functional configuration of a portable terminal in the embodiment of the present invention.

Next, a functional block of the portable terminal 20 will be described with reference to a block diagram of FIG. 3. Here, the onboard navigation device 10 described above receives the supply of the power source from the vehicle 60a, but the portable terminal 20 receives the supply of the power source from a battery (not illustrated) provided therein. However, in order to charge the battery, the portable terminal 20 may receive the supply of the power source from a cigarette socket or the like of the vehicle 60b.

As illustrated in FIG. 2, the portable terminal 20 is configured by including a control unit 21, a storage unit 22, a communication unit 23, a sensor unit 24, a display unit 25, an input unit 26, and a near field communication unit 27. Here, the control unit 21, the storage unit 22, the communication unit 23, the sensor unit 24, the display unit 25, and the input unit 26 have the same functions as those of the functional blocks of the same names included in the onboard navigation device 10 described above. That is, each of the functional blocks of the portable terminal 20 will be described by replacing the "onboard navigation device 10" in the description of the onboard navigation device 10 described above with the "portable terminal 20", and thus, the overlapping description will be omitted.

On the other hand, the portable terminal 20 is different from the onboard navigation device 10 in that the portable terminal 20 includes the near field communication unit 27, and thus, the difference will be described below. The near field communication unit 27 is a portion for performing non-contact near field communication based on a standard such as near field communication (NFC) or Bluetooth (Registered Trademark), or wired near field communication through a universal serial bus (USB) cable or the like. On the other hand, the vehicle 60b includes a near field communication unit for performing communication with respect to the near field communication unit 27. For example, an electronic control unit (ECU) of the vehicle 60b includes the near field communication unit. Then, there is a case where the portable terminal 20 is capable of performing the communication with respect to the ECU through the near field communication, that is, a case where the portable terminal 20 exists in the vehicle 60b. In this case, the position information of the portable terminal 20 that is positioned by the sensor unit 24 corresponds to the position information of the vehicle 60b.

Therefore, a position information transmitting unit 212 is activated while the portable terminal 20 is capable of performing the near field communication with respect to the ECU through the near field communication unit 27. Then, as with the position information transmitting unit 112 of the onboard navigation device 10, the activated position information transmitting unit 212 transmits position information 221 and discrimination information 222 for identifying the movement route of the vehicle 60b that is positioned by the sensor unit 24 with respect to the information analysis device 30.

For example, in a case where the user possessing the portable terminal 20 is in the vehicle 60b, and sets an activation switch of the vehicle 60b, such as an ignition switch, to ON, the vehicle 60b and the portable terminal 20 are connected to each other (paired with each other), and the position information 221 that is positioned by the portable terminal 20, and the discrimination information 222 are transmitted to the information analysis device 30 from the portable terminal 20. In this case, a position identified by the position information 121 that is positioned immediately after the vehicle 60b and the portable terminal 20 are paired with each other can be transmitted to the information analysis device 30, as the initial vehicle position, that is, the start position.

Further, in a case where the activation switch of the vehicle 60b, such as the ignition switch, is set to Off, the pairing between the vehicle 60b and the portable terminal 20 is released. In this case, a position identified by the position information 121 that is positioned immediately before the pairing between the vehicle 60b and the portable terminal 20 is released can be transmitted to the information analysis device 30, as the final vehicle position, that is, the parking position. In this case, as with the position information transmitting unit 112, the real-time transmission may be performed, or the burst transmission may be performed, the burst transmission may be switched to the real-time transmission in a case where it is determined that the vehicle arrives at the destination, the information indicating the start position or the parking position may be added, and the parking position may be transmitted at the time of performing re-activation.

Furthermore, in a case where the vehicle 60b has a function of positioning the position information, the position information that is positioned by the vehicle 60b but not the position information that is positioned by the sensor unit 24 may be transmitted to the information analysis device 30, as the position information 121. In this case, the sensor unit 24 may be omitted from the portable terminal 20.

<Functional Block of Information Analysis Device 30>

Next, a functional block of the information analysis device 30 will be described with reference to a block diagram of FIG. 4.

Figure 4:
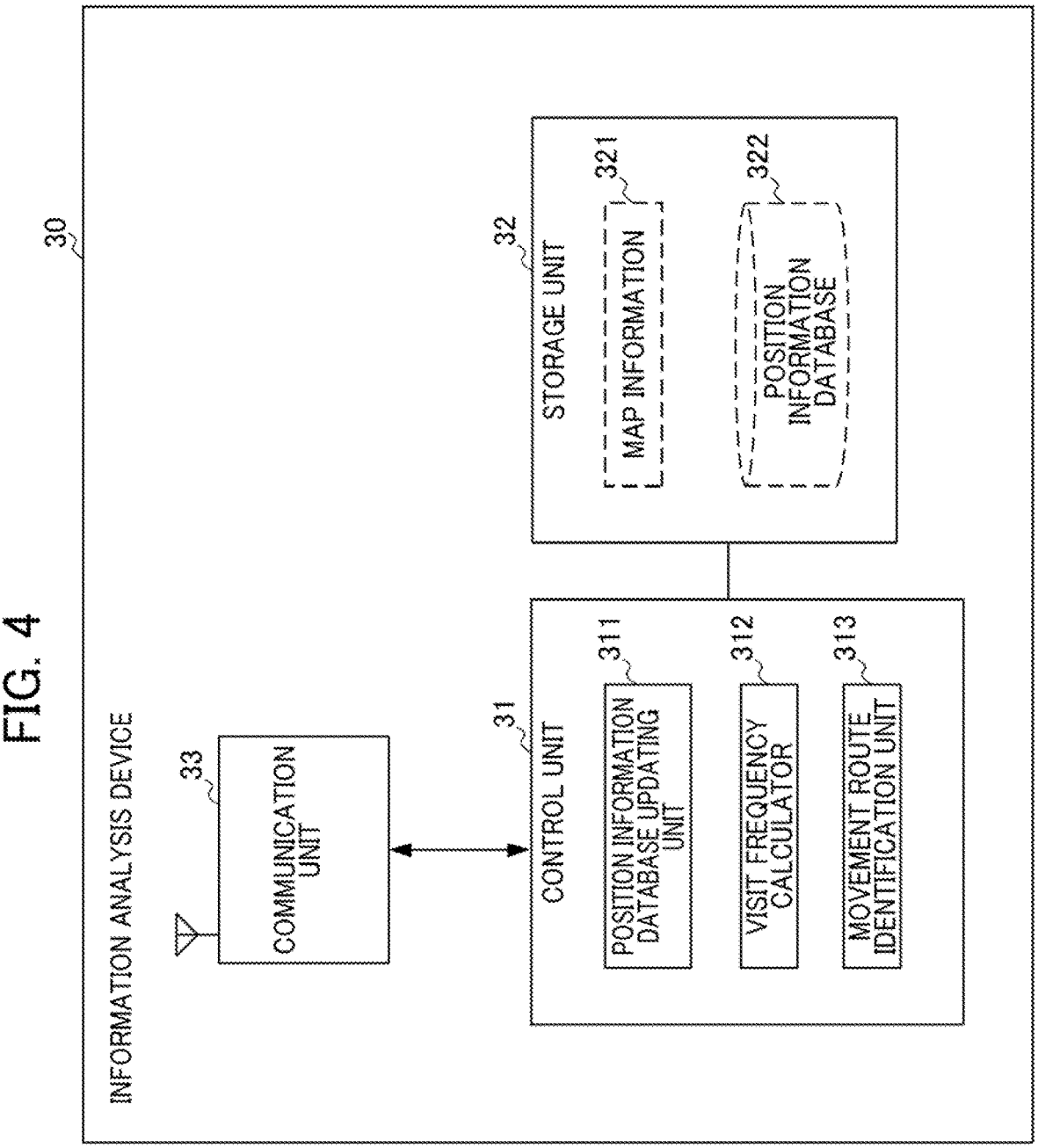
FIG. 4 is a functional block diagram illustrating a functional configuration of an information analysis device in the embodiment of the present invention.

As illustrated in FIG. 4, the information analysis device 30 includes a control unit 31, a storage unit 32, and a communication unit 33.

The control unit 31 is configured of an arithmetic processing device such as a microprocessor, and controls each unit configuring the information analysis device 30. The details of the control unit 31 will be described below.

The storage unit 32 is configured of a semiconductor memory or the like, and stores a control program referred to as firmware or an operating system, each program such as a program for performing the information analysis processing, and various information items such as the map information. In the drawing, map information 321 and a position information database 322 that are information particularly relevant to the analysis processing of the position information are illustrated as the information stored in the storage unit 32.

The map information 321 includes information such as information relevant to a feature such as a road or a facility, road information, facility position information, and parking lot information. In addition, the map information 321 further includes road network data including map data for displaying a background of a road, a road map, and the like, position information of a node (for example, an intersection, a bending point, a corner point, or the like of the road) and type information thereof, position information of a link that is a route connecting the nodes and type information thereof, link cost data relevant to cost information of all of the links (for example, a distance, required time, or the like), and the like. So-called road map information such as the type of road or a traffic light is stored as the road information.

In the facility position information, the position information of each of the facilities is stored as latitude and longitude information. In addition, the facility position information may include incidental information such as discrimination information (a facility ID), a name, facility classification (and/or genre), a telephone number, an address, and an opening hour of the facility, and in a case where the facility is a restaurant, a menu to be provided, and facility information relevant to merchandise service or the like. In the parking lot information, position information of the parking lot is stored as the latitude and longitude information. In a case where the parking lot is a parking lot of each of the facilities, the facility and the parking lot are stored by being associated with each other.

The map information 321 may be configured by being stored in advance in the storage unit 32, or may be configured by being suitably downloaded from the server device (not illustrated) or the like that is connected to the communication network 50, as necessary. Further, the map information 321 may be suitably corrected in accordance with the input of the user, or the like.

The position information database 322 is a database that is constructed on the basis of the position information 121 and the position information 221, and the discrimination information 122 and the discrimination information 222 that are received from the onboard navigation device 10 and the portable terminal 20, respectively. The position information database 323 is constructed by a position information database updating unit 311 described below. The details of the position information database 323 will be described below when the position information database updating unit 311 is described. Furthermore, in the following description, in the case of not distinguishing the position information 121 from the position information 221, the reference numeral will be omitted, and the position information 121 and the position information 221 will be simply referred to as "position information". In addition, similarly, in the case of not distinguishing the discrimination information 122 from the discrimination information 222, the reference numeral will be omitted, and the discrimination information 122 and the discrimination information 222 will be simply referred to as "discrimination information".

The communication unit 33 includes a digital signal processor (DSP), and the like, and realizes wireless communication with respect to the other device via the communication network 50 through the communication network 50, on the basis of a standard such as 3rd generation (3G), long term evolution (LTE), or Wi-Fi (registered trademark). The communication unit 33, for example, is used for receiving the position information and the discrimination information that are transmitted from the onboard navigation device 10 and the portable terminal 20, respectively. In addition, the communication unit 33, for example, is used for receiving the analysis condition that is transmitted from the analysis information reference terminal 40. Further, the communication unit 33, for example, is used for transmitting the analysis information with respect to the analysis information reference terminal 40. However, the data that is transmitted and received between the communication unit 33 and the other device is not particularly limited, and information other than the information described above may be transmitted and received.

Next, the details of the control unit 31 will be described. The control unit 31 is configured of a microprocessor including a central processing unit (CPU), a random access memory (RAM), a read only memory (ROM), input/output (I/O), and the like. The CPU executes each program that is read from the ROM or the storage unit 32, reads out the information from the RAM, the ROM, and the storage unit 32 when the program is executed, and writes the information with respect to the RAM and the storage unit 32, and thus, performs the delivery of the signal with respect to the communication unit 33, the sensor unit 34, the display unit 35, and the input unit 36. Then, hardware and software (a program) cooperate with each other in this way, and thus, the processing of this embodiment is realized.

The control unit 31 includes the position information database updating unit 311, a visit frequency calculator 312, and a movement route identification unit 313, as a functional block. The position information database updating unit 311 is a portion which constructs and suitably updates the position information database 322. An example of a data structure of the position information database 322 will be described with reference to FIG. 5.

As illustrated in FIG. 5, the position information database 322 includes the "discrimination information" and the "position information" that are received from the onboard navigation device 10 and the portable terminal 20, respectively, as described above, and a "facility to be visited" and the "start position", as attribution. Then, the position information database updating unit 311 stores information corresponding to each attribution in a field by using the facility to be visited, and the position information as a combination, for each of the discrimination information items, and thus, creates the position information database 322.

Here, the "discrimination information" in the position information database 322 is information for discriminating the onboard navigation device 10 or the portable terminal 20 that is a transmission source of the position information, as described above. That is, the "discrimination information" is information for discriminating the vehicle 60 corresponding to the onboard navigation device 10 or the portable terminal 20.

In addition, the "facility to be visited" in the position information database 322 is information for discriminating a facility to which the user visits by the vehicle 60. The position information database updating unit 311 identifies the facility to be visited from the position information that is received along with the discrimination information. For example, as described above, a case is considered in which information indicating the parking position is included in the position information. In this case, the parking position is compared to the position of the facility included in the map information 321 (and the position of the parking lot associated with the facility), and in a case where the parking position is coincident with the position of the facility, it is possible to determine that the user visits to the facility by the vehicle 60.

In this case, the discrimination information (a facility ID) of the facility included in the map information 321 is stored in the field of the facility to be visited, in the position information database 322. Furthermore, in a case where the information indicating the parking position is not included in the position information, for example, for example, it is possible to consider a position corresponding to position information that is finally received after the transmission of the position information is started once, as the parking position. In addition, in a case where a position corresponding to position information to be transmitted is not changed for longer than or equal to a defined period of time, it is possible to consider the position as the parking position.

Further, the "start position" in the position information database 322 is information for identifying a position from which the user is started by the vehicle 60. The position information database updating unit 311 identifies the start position from the position information that is received along with the discrimination information. For example, as described above, in a case where the information indicating the start position is included in the position information, the information indicating the start position is stored in the field of the start position, in the position information database 322. Furthermore, in a case where the information indicating the start position is not included in the position information, for example, it is possible to consider a position corresponding to position information that is initially received, as the start position.

Further, the "position information" in the position information database 322 is the entire position information after the transmission of the position information is started once, until the transmission of the position information is ended. It is possible to identify the movement route from the start position to the stop position by the entire position information.

The position information database updating unit 311 stores each of the information items described above in a new field, every time when the transmission of the position information and the discrimination information is started once, and then, is ended from any one of the onboard navigation device 10 and the portable terminal 20, on the basis of the position information and the discrimination information that are received, and thus, updates the position information database 322.

Next, the visit frequency calculator 312 and the movement route identification unit 313 will be described. The visit frequency calculator 312 and the movement route identification unit 313 are a portion analyzing the position information or the like that is stored in the position information database 322 in cooperation.

First, the visit frequency calculator 312 calculates the number of times of visiting to each of the facilities for each of the discrimination information items (that is, for each of the users of each of the vehicles 60), with reference to the position information database 322 described above. For example, in discrimination information "abc123", a visit frequency with respect to a facility "AAA" is calculated as "twice".

Next, the movement route identification unit 313 carries out the analysis in accordance with the analysis condition, and generates the analysis information on the basis of an analysis result. Here, as described above, the analysis condition is a condition that is input by the user of the analysis information reference terminal 40 in order to obtain desired analysis information.

Here, the analysis condition, for example, is a condition with respect to the visit frequency. For example, in a case where the user of the analysis information reference terminal 40 hopes to "acquire only the movement route with respect to the vehicle 60 visiting to a certain facility a plurality of times, as the analysis information", an analysis condition of "discrimination information" of the certain facility and the "visit frequency is a plurality of times" is input as the analysis condition. In this case, the value of the plurality of times may be input as the analysis condition. Accordingly, the user of the analysis information reference terminal 40 is capable of knowing the movement route of the vehicle 60 visiting to the facility many times. That is, it is possible to know a movement route of a so-called regular customer.

On the other hand, for example, in a case where the user of the analysis information reference terminal 40 hopes to "acquire only the movement route with respect to the vehicle 60 of which the number of times of visiting to a certain facility is less than or equal to a predetermined number of times, as the analysis information", an analysis condition of "discrimination information" of the certain facility and the "visit frequency of less than or equal to a predetermined number of times" is input as the analysis condition. In this case, the value of the predetermined number of times may be input as the analysis condition. Accordingly, the user of the analysis information reference terminal 40 is capable of knowing the movement route of the vehicle 60 that has visited to the facility, but has not visited to the facility afterward or has visited to the facility only once. That is, it is possible to know a movement route of a so-called chance customer.

Further, a condition with respect to the start position may be input as another analysis condition. For example, in a case where the user of the analysis information reference terminal 40 hopes to "acquire only the movement route with respect to the vehicle 60 visiting to a certain facility from a long distance, as the analysis information", an analysis condition of "discrimination information" of the certain facility and the "start position is out of a predetermined range from a facility position" is input as the analysis condition. Accordingly, the user of the analysis information reference terminal 40 is capable of knowing the movement route of the vehicle 60 visiting to the facility from a long distance.

On the contrary, for example, in a case where the user of the analysis information reference terminal 40 hopes to "acquire only the movement route with respect to the vehicle 60 visiting to a certain facility from a short distance, as the analysis information", an analysis condition of the "start position is in a predetermined range from the facility position" is input as the analysis condition. Accordingly, the user of the analysis information reference terminal 40 is capable of knowing the movement route of the vehicle 60 visiting to the facility from a short distance.

In addition, in any case, the size of a predetermined range may be input as the analysis condition. The size of the predetermined range may be input as 10 [km] in a linear distance from the facility. Further, another analysis condition may be input. For example, a time zone or a day of the week may be input as the analysis condition. Accordingly, it is possible to know the movement route of the vehicle 60 visiting to the facility at a certain time zone, or the movement route of the vehicle 60 visiting to the facility on a certain day of the week. In addition, the analysis conditions described above may be arbitrarily combined.

The movement route identification unit 313 identifies the movement route on the basis of the position information with respect to the vehicle 60 satisfying such analysis conditions, and generates the analysis information by the identified movement route. The analysis information, for example, is generated as image data for displaying an image that is visible for the user. Next, a specific example in the case of displaying the analysis information will be described below with reference to FIGS. 7 to 9, after the analysis information reference terminal 40 is described.

<Functional Block of Analysis Information Reference Terminal 40>

Figure 6:
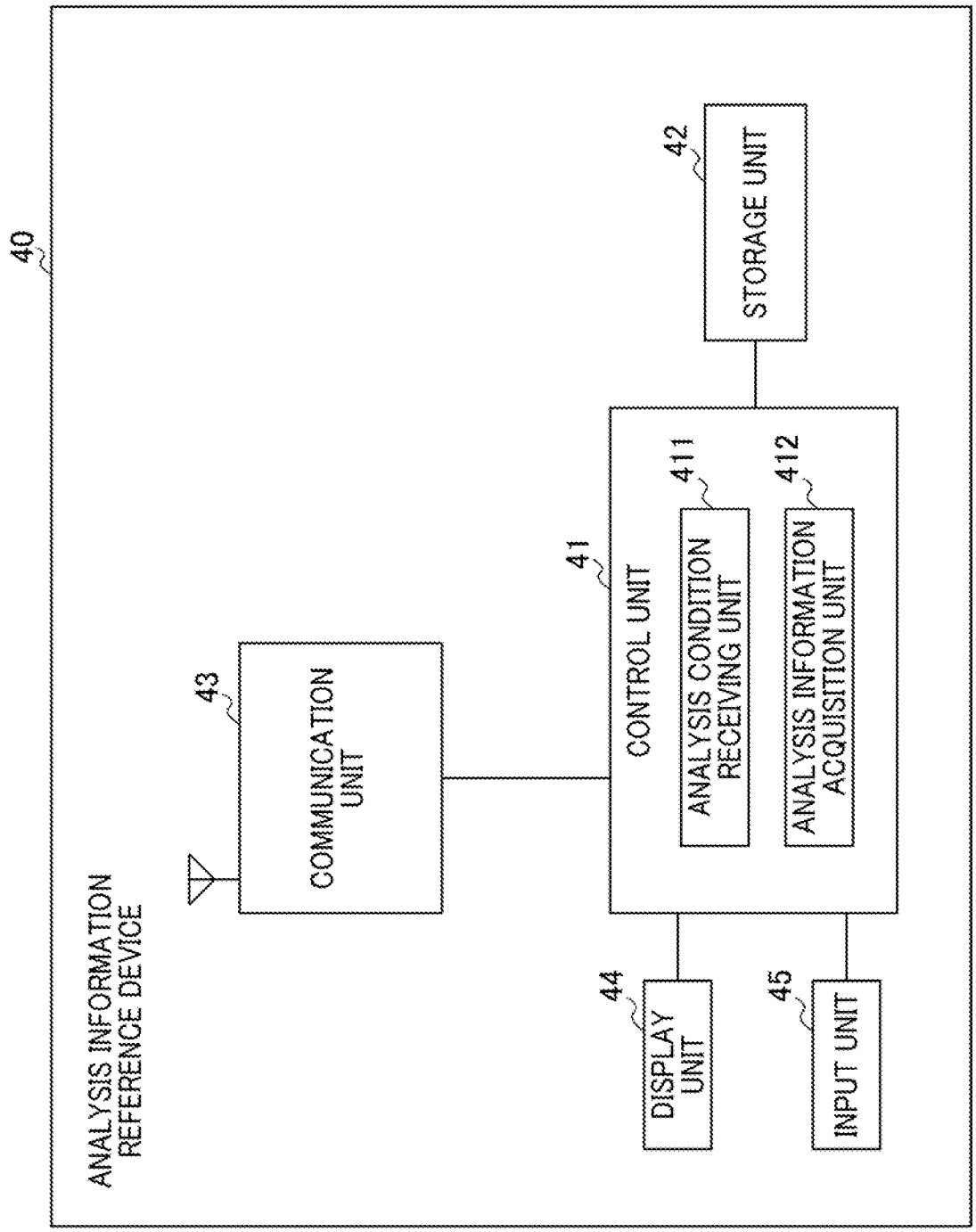
FIG. 6 is a functional block diagram illustrating a functional configuration of an analysis information reference terminal in the embodiment of the present invention.

The analysis information reference terminal 40 can be realized by a general personal computer, and thus, the detailed description thereof will be omitted. As illustrated in FIG. 6, a customer terminal 4 includes at least a control unit 41, a storage unit 42, a communication unit 43, a display unit 44, and an input unit 45. The configuration of each unit, for example, is identical to that of each unit having the same name as that of the onboard navigation device 10 or the portable terminal 20.

The control unit 41 includes an analysis condition receiving unit 411 and an analysis information acquisition unit 412. The analysis condition receiving unit 411 generates a user interface for receiving the input of the analysis condition from the user, and displays the generated user interface with respect to the display unit 44 that is realized by a display. The user of the analysis information reference terminal 40 inputs the analysis condition in the input unit 45 that is input by an input interface such as a keyboard or a mouse, with reference to the user interface. The communication unit 43 transmits the analysis condition with respect to the information analysis device 30, and receives the analysis information from the information analysis device 30. The received analysis information is acquired by the analysis information acquisition unit 412. The analysis information acquisition unit 412 displays the acquired analysis information with respect to the display unit 44. Accordingly, the user of the analysis information reference terminal 40 is capable of referring to an image corresponding to the analysis information.

<Specific Example of Display Corresponding to Analysis Information>

Figure 7:
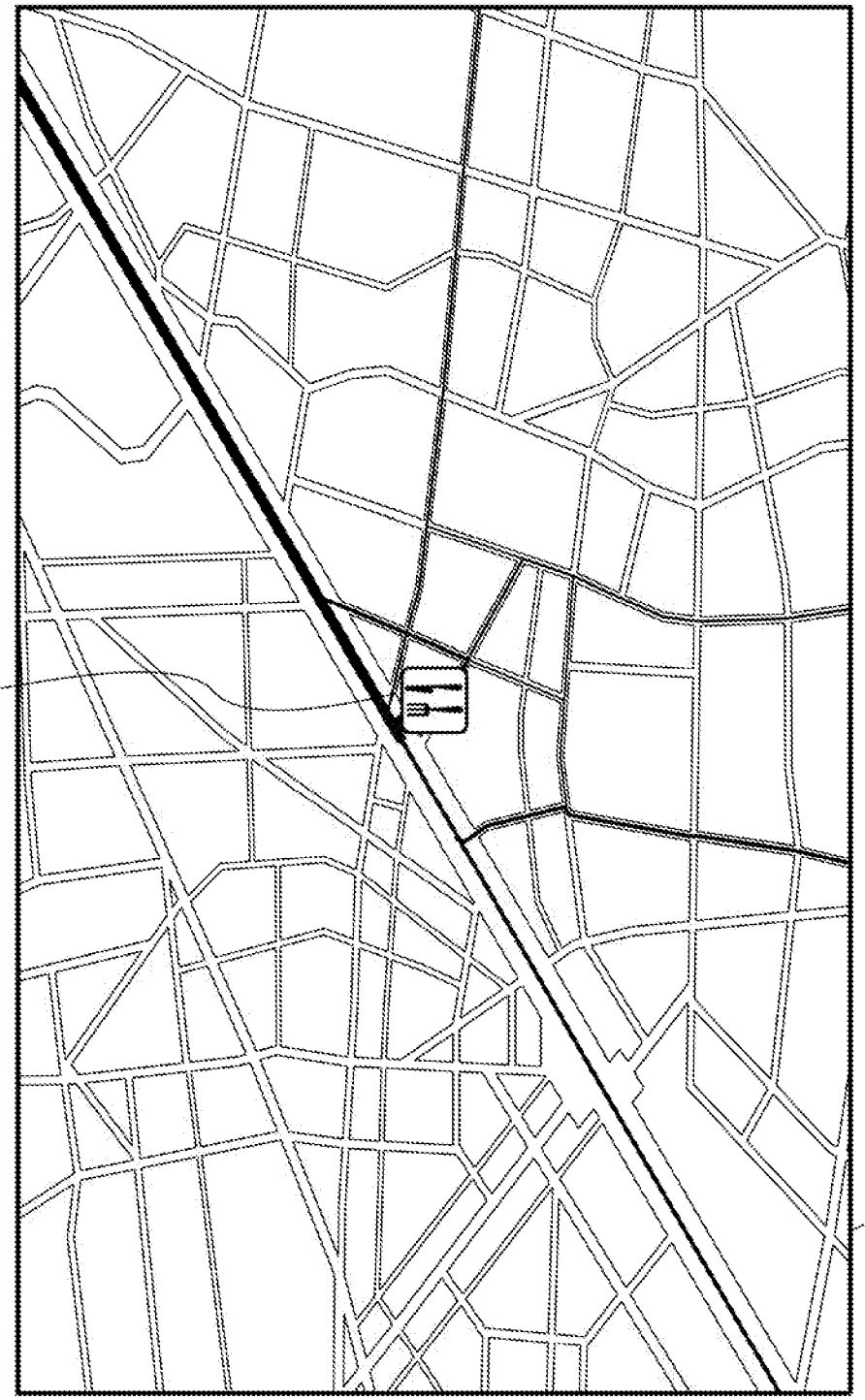
FIG. 7 is a diagram illustrating a display example of analysis information (movement route display and map display) in an embodiment of the present invention.

Next, a specific example of display corresponding to the analysis information will be described with reference to FIGS. 7 to 9. The display of image data corresponding to the analysis information on the display unit 44, for example, is as illustrated in FIG. 7. In the example of FIG. 7, a facility icon 71 is arranged on the center of a screen, and the facility icon 71 and movement route display 72 are displayed by being overlaid on map display 73. The facility icon 71 is an icon corresponding to a certain facility that is input in the analysis condition. The map display 73 is map display that is generated on the basis of the 321, and represents a road in the vicinity of the certain facility that is input in the analysis condition. Then, the movement route display 72 represents a movement route that is identified on the basis of the position information with respect to the vehicle 60 satisfying the analysis condition.

Here, in the analysis information, it is desirable that it is possible to know through which route many (or few) vehicles 60 visit to a certain facility. Therefore, a route on which many vehicles 60 are moved can be distinguished from a route on which a few vehicles 60 are moved. For example, the routes can be distinguished from each other in accordance with the thickness, the color, or the like of a line representing the movement route. That is, in the route on which many vehicles 60 are moved, the line is set to be thick or set to a color that is comparatively easily visible, and in the route on which a few vehicles 60 are moved, the line is set to be thin or set to a color that is comparatively difficult to be visible. In addition, the thickness or the like of the line may be more gradually changed in accordance with the number of vehicles 60 that are moved, as well as two steps of many vehicles or a few vehicles. In a case where the user refers to the example of FIG. 7, for example, it is known that there are many vehicles 60 visiting from an upper right direction. In addition, in a road that is adjacent to a facility extending to a lower left direction from the upper right direction and has a large width, it is known that the number of vehicles 60 visiting to the facility by turning left is greater than the number of vehicles 60 visiting to the facility by turning right.

Figure 8:
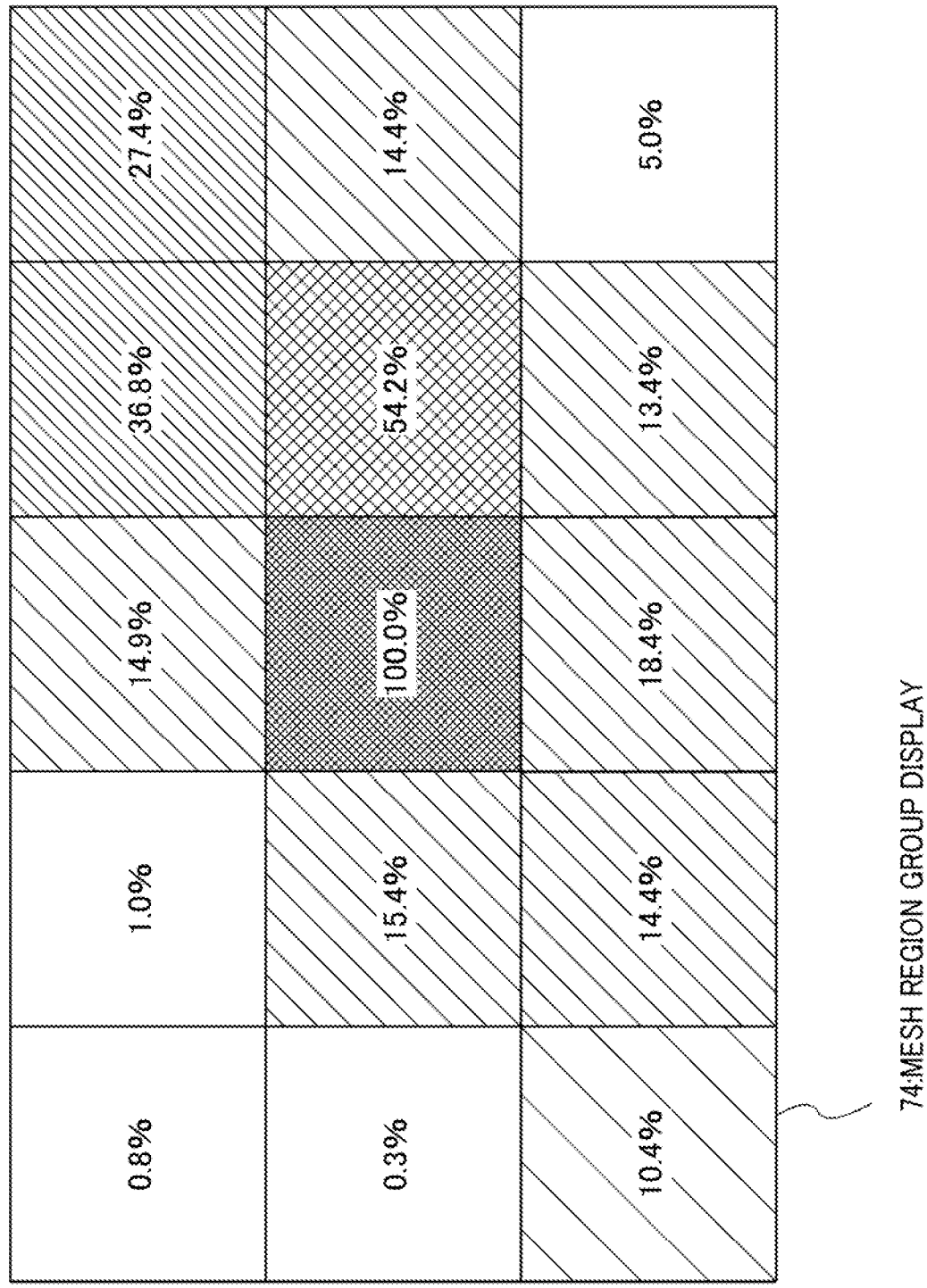
FIG. 8 is a diagram illustrating another display example of the analysis information (mesh region group display) in the embodiment of the present invention.

Next, another display example of the image data that is the analysis information is illustrated in FIG. 8. In this embodiment, the map information 321 also includes map information in which a region on a map is partitioned into the shape of a lattice, and is managed as a rectangular mesh-like predetermined region (hereinafter, referred to as a "mesh region").

Then, in the example of FIG. 8, the analysis information is generated on the basis of the map information that is managed in the mesh region, and mesh region group display 74 that is a group of mesh regions in the vicinity of a certain facility input in the analysis condition is displayed. Here, as described above, in the analysis information, it is desirable that it is possible to know through which route many (or few) vehicles 60 visit to a certain facility. Therefore, in this example, it is determined whether or not the movement route of the vehicle 60 satisfying the analysis condition is included in the mesh region for each of the mesh regions. Then, the display is performed to be visible in accordance with the number of times in which the movement route is included in the mesh region. Specifically, a ratio of including the movement route in the mesh region is displayed by being overlaid on the mesh region, as a numerical value. The ratio can be calculated by setting the number of vehicles 60 satisfying the analysis condition to a denominator, and by setting the number of vehicles 60 of which the movement route is included in the mesh region to a numerator.

For example, the central mesh region described with 100.0% is a mesh region in which a certain facility input in the analysis condition exists. Here, it is necessary to move in the mesh region in order to visit to the certain facility, and thus, the ratio is 100.0%. Then, in a case where the user compares the mesh region with other mesh regions with reference to the example of FIG. 8, as with the case of referring to the example of FIG. 7, it is known that there are many vehicles 60 visiting from the upper right direction. In addition, in the example of FIG. 7, the number of vehicles 60 included in the movement route is represented by the thickness of the line, or the like, but in this example, the number of vehicles 60 included in the movement route is represented by a number. For this reason, in this example, more specifically, it is possible to know through which route many (or few) vehicles 60 visit to a certain facility. Furthermore, the colors of each of the mesh regions, and the hatchings are different in accordance with the ratio, in addition to the numerical value, and thus, it is possible to more intuitively grasp the number of vehicles 60.

Figure 9:
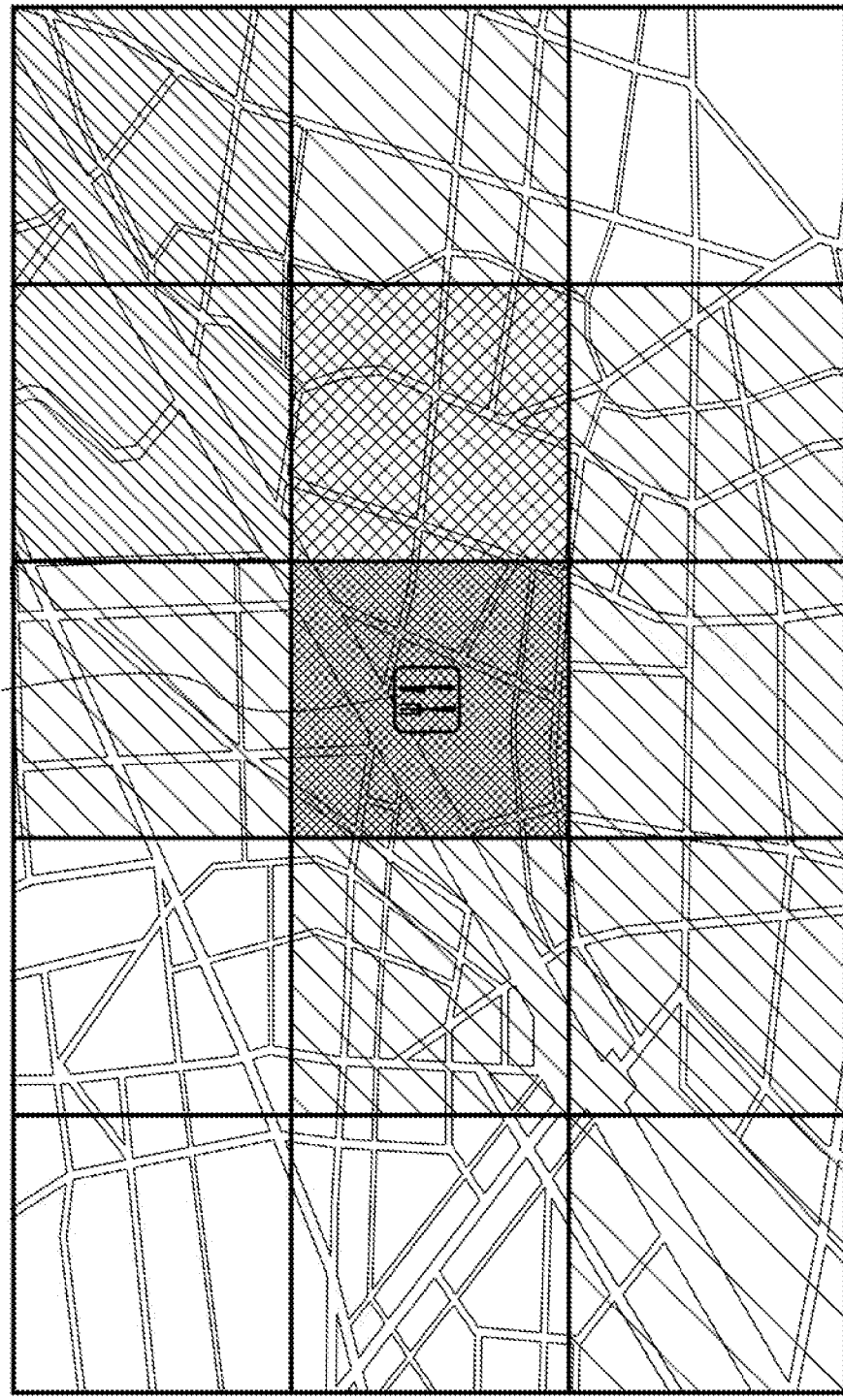
FIG. 9 is a diagram illustrating another display example of the analysis information (mesh region group display and map display) in the embodiment of the present invention.

Next, still another display example of the image data that is the analysis information is illustrated in FIG. 9. In the example of FIG. 9, the mesh region group display 74 illustrated in the example of FIG. 8 is displayed by being overlaid on the map display 73. Then, in a case where the user compares the mesh region with other mesh regions with reference to the example of FIG. 9, as with the case of referring to the example of FIG. 7 or FIG. 8, it is known that there are many vehicles 60 visiting from the upper right direction. In addition, in this example, it is possible to refer to map display 73 together, and thus, it is possible to easily grasp a correspondence relationship between the mesh region and the map information.

<Operation of This Embodiment>

Figure 10:
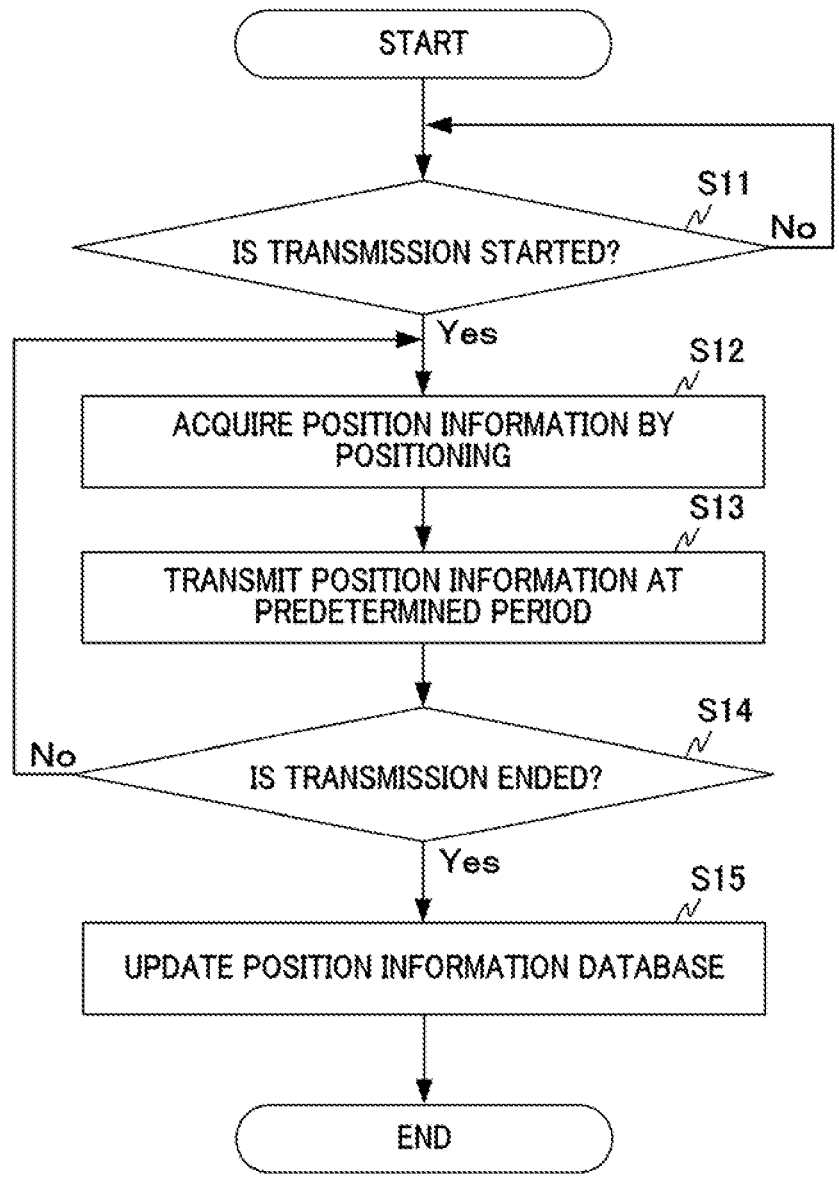
FIG. 10 is a flowchart illustrating a basic operation at the time of collecting the position information and of updating the position information database in the embodiment of the present invention.
Figure 11:
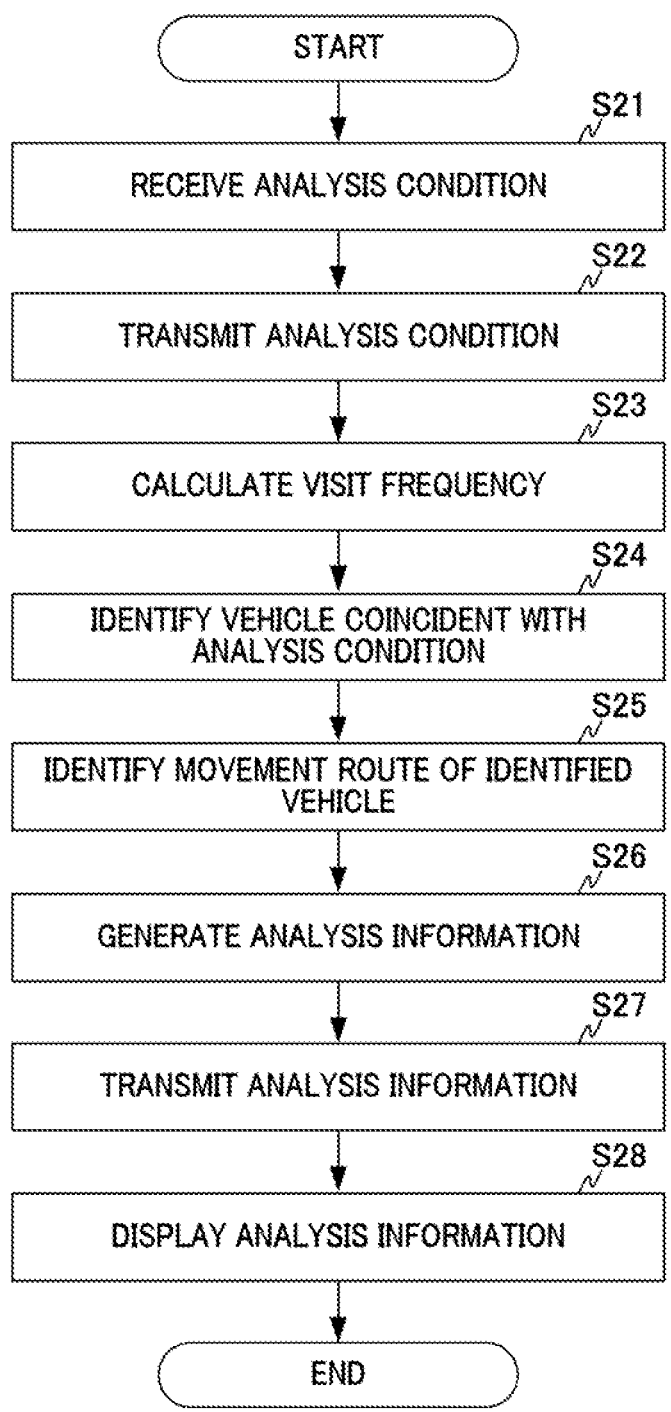
FIG. 11 is a flowchart illustrating a basic operation at the time of information analysis processing in the embodiment of the present invention.

Next, an operation of this embodiment will be described with reference to flowcharts of FIGS. 10 and 11. Here, FIG. 10 is a flowchart illustrating an operation at the time of collecting the position information and of updating the position information database. In addition, FIG. 11 is a flowchart illustrating an operation at the time of information analysis processing.

First, the operation at the time of collecting the position information with respect to the onboard navigation device 10 and of updating the position information database will be described with reference to FIG. 10. The position information transmitting unit 112 determines whether or not to start the transmission of the position information (Step S11). Here, as described above, in a case where the vehicle 60a is in the ignition-switch-on state, the transmission is started. In the case of the ignition-switch-off state (No in Step S11), the transmission of the position information transmitting unit 112 is not started. On the other hand, in the case of the ignition-switch-on state (Yes in Step S11), the process proceeds to Step S12.

In Step S12, the sensor unit 14 acquires the position information by positioning the onboard navigation device 10 (Step S12). The position information transmitting unit 112 acquires the position information from the sensor unit 14, and performs the real-time transmission or the burst transmission of the acquired position information with respect to the information analysis device 30 at a predetermined period (Step S13).

Next, the position information transmitting unit 112 determines whether or not to end the transmission of the position information (Step S14). As described above, in a case where the vehicle 60a is in the ignition-switch-off state, the transmission is ended. In a case where the vehicle 60a is in the ignition-switch-on state (No in Step S14), the positioning in Step S12 and the transmission in Step S13 are repeated.

On the other hand, in a case where the vehicle 60a is in the ignition-switch-off state (Yes in Step S14), the process proceeds to Step S15.

In Step S15, the position information database updating unit 311 of the information analysis device 30 updates the position information database 322 on the basis of the position information that is transmitted by repeating Step S12 and Step S13 (Step S15). According to the operation described above, the collection of the position information and the update of the position information database are realized.

Next, the operation at the time of collecting the position information with respect to the portable terminal 20 and of updating the position information database will be described. In the portable terminal 20, as described above, the position information transmitting unit 112 may be replaced with the position information transmitting unit 211, the sensor unit 14 may be replaced with the sensor unit 24, the standard to be Yes in Step S11 may be replaced with a "case where the activation switch of the vehicle 60b, such as the ignition switch, is set to On, and the vehicle 60b and the portable terminal 20 are paired with each other", and the standard to be Yes in Step S14 may be replaced with a "case where the activation switch of the vehicle 60b, such as the ignition switch, is set to Off, and the pairing between the vehicle 60b and the portable terminal 20 is released". Accordingly, the overlapped description will be omitted.

Next, the operation at the time of information analysis processing will be described with reference to the flowchart of FIG. 11. First, the analysis condition receiving unit 411 of the analysis information reference terminal 40 receives the analysis condition from the user through the input unit 45 (Step S21).

Then, the analysis condition receiving unit 411 transmits the received analysis condition with respect to the information analysis device 30 (Step S22).

The visit frequency calculator 312 of the information analysis device 30 that receives the analysis condition calculates the visit frequency with respect to the facility that is designated by the analysis condition, with respect to each of the vehicles 60 (Step S23).

Next, the movement route identification unit 313 identifies the vehicle 60 that is coincident with the analysis condition (Step S24).

Then, the movement route identification unit 313 identifies the movement route of each of the identified vehicles (Step S25).

In addition, the movement route identification unit 313 generates the analysis information on the basis of the movement route of each of the identified vehicles (Step S26).

Further, the movement route identification unit 313 transmits the generated analysis information with respect to the information analysis device 30 (Step S27).

The analysis information acquisition unit 412 of the analysis information reference terminal 40 that receives the analysis information displays the acquired analysis information with respect to the display unit 44 (Step S28).

According to this embodiment described above, an effect is obtained in which the position information is collected by the onboard navigation device 10 or the portable terminal 20, the collected position information is statistically analyzed in accordance with a predetermined condition, and thus, the analysis information can be generated.

<Advantages of Analysis Information>

Then, an effect is also obtained in which it is possible to use the analysis information that is obtained as described above as information advantageous for the user. The effects will be described in detail. For example, in this embodiment, the position information is analyzed, and thus, it is possible to generate the analysis information for carrying out the display as illustrated in the example of FIGS. 7 to 9. Then, as described above with reference to FIGS. 7 to 9, the user referring to the analysis information is capable of knowing information indicating from which direction many (or few) vehicles 60 visit, or information indicating which mesh region many (or few) vehicles 60 have as movement route, with respect to the movement route of the vehicle 60 visiting to the facility. Accordingly, for example, in a case where the facility is a store, it is possible to use the analysis information for determining which position in which direction is effective for providing a nameboard, or which position is suitable for a parking lot. In addition, for example, it is possible to use the analysis information for determining which area is effective for distributing a flyer.

In addition, as a premise, in this embodiment, the user identifies the vehicle 60 in a desired analysis condition, and thus, more specifically, for example, it is known from which direction the vehicle 60 visiting to the facility many times comes, or on the contrary, from which direction the vehicle 60 visiting to the facility only once comes. Accordingly, for example, there are competing stores in this direction, and thus, it is possible to use the analysis information for determining a trading zone in which the vehicle 60 visiting the facility many times from the direction is few.

Further, various analysis information items are acquired in accordance with various analysis conditions, and thus, it is possible to perform verification by comparing various analysis information items. For example, the analysis information is acquired with respect to each of the vehicle 60 visiting to the facility many times, and the vehicle 60 visiting to the facility only once, and thus, it is possible to perform verification by comparing different tendencies.

As described above, according to this embodiment, it is possible to provide information advantageous for the user. Furthermore, the analysis information, for example, is advantageous even in the case of being used by an organizer of the facility, or is advantageous in the case of being used by a consultant of the facility.

<Hardware and Software>

Furthermore, each device included in the navigation system described above can be realized by hardware, software, or a combination thereof. In addition, a navigation method performed by a cooperation between the devices included in the navigation system described above can be realized by hardware, software, or a combination thereof. Here, the navigation method being realized by software indicates that a computer reads and executes a program, and thus, the navigation method is realized.

The program can be stored by using various types of non-transitory computer readable media, and can be supplied to the computer. The non-transitory computer readable medium includes various types of tangible storage media. Examples of the non-transitory computer readable medium include a magnetic storage medium (for example, a flexible disk, a magnetic tape, and a hard disk drive), a magneto optical storage medium (for example, a magneto optical disk), a CD-read only memory (ROM), a CD-R, a CD-R/W, and a semiconductor memory (for example, a mask ROM, a programmable ROM (PROM), an erasable PROM (EPROM), a flash ROM, and a random access memory (RAM)). In addition, the program may be supplied to the computer by various types of transitory computer readable media. Examples of the transitory computer readable medium include an electric signal, an optical signal, and an electromagnetic wave. The transitory computer readable medium is capable of supplying the program to the computer through wired communication path such as an electric wire and an optical fiber, or a wireless communication path.

<Modification Example>

The embodiment described above is a preferred embodiment of the present invention, but the scope of the present invention is not limited only to the embodiment described above, and is capable of including embodiments in which various changes are carried out within a range not departing from the gist of the present invention.

For example, the functional configurations of FIGS. 2, 3, 4, and 6 are merely an example, and are not limited to the functional configurations of this embodiment. That is, it is sufficient that each device has a function capable of executing a set of processing relevant to an information analysis function of the present invention as a whole, and using which functional block to realize the function is not particularly limited to the examples of FIGS. 2, 3, 4, and 6.

In addition, as another modification example, the onboard navigation device 10 or the portable terminal 20 may be realized by other devices not having a route guidance function. That is, the route guidance function of the onboard navigation device 10 or the portable terminal 20 is not a required component. In this case, the information analysis device 30 may further have the route guidance function, and the information analysis device 30 may communicate with the onboard navigation device 10 or the portable terminal 20, and thus, may perform the route guidance.

Further, as another modification example, in the embodiment described above, it has been described that the information analysis device 30 is realized by one server device or the like, but a dispersion processing system may be used in which the functions of the information analysis device 30 are suitably dispersed to a plurality of server devices, respectively. In addition, a virtual server function or the like is used on a cloud, and thus, each of the functions of the information analysis device 30 may be realized.

Further, as another modification example, the information analysis device 30 may have a function as the analysis information reference terminal 40. That is, an input unit and a display unit may be provided in the information analysis device 30, the analysis condition may be received from the user by the input unit of the information analysis device 30, and the analysis information may be displayed on the display unit of the information analysis device 30.

Further, in another modification example, the size of the mesh region of the mesh region group display 74 described with reference to FIG. 8 or FIG. 9 may be variable. For example, the size of the mesh region in an area where roads are closely spaced may be smaller than the size of an area where less roads exist.

EXPLANATION OF REFERENCE NUMERALS

1 INFORMATION ANALYSIS SYSTEM
10 ONBOARD NAVIGATION DEVICE
11, 21, 31, 41 CONTROL UNIT
111, 211 ROUTE GUIDING UNIT
112, 212 POSITION INFORMATION TRANSMITTING UNIT
12, 22, 32, 42 STORAGE UNIT
121, 221 POSITION INFORMATION
122, 222 DISCRIMINATION INFORMATION
13, 23, 33, 43 COMMUNICATION UNIT
14, 24 SENSOR UNIT
15, 25, 44 DISPLAY UNIT
16, 26, 45 INPUT UNIT
20 PORTABLE TERMINAL
27 NEAR FIELD COMMUNICATION UNIT
30 INFORMATION ANALYSIS DEVICE
311 POSITION INFORMATION DATABASE UPDATING UNIT
312 VISIT FREQUENCY CALCULATOR
313 MOVEMENT ROUTE IDENTIFICATION UNIT
321 MAP INFORMATION
322 POSITION INFORMATION DATABASE
40 ANALYSIS INFORMATION REFERENCE TERMINAL
411 ANALYSIS CONDITION RECEIVING UNIT
412 ANALYSIS INFORMATION ACQUISITION UNIT
50 COMMUNICATION NETWORK
60a, 60b VEHICLE

The invention claimed is:

1. An information analysis system, comprising:
an information analysis device and an analysis information reference device which is connected to communicate with the information analysis device through a communication network, wherein the information analysis device includes:
   a receiving unit, implemented via a microprocessor including a timer, that receives position information of a plurality of movable bodies wherein the position information includes information indicating a position at a time when positioning is performed and the time when the positioning is performed;
   a storage unit, implemented via a memory, that stores information relevant to a plurality of roads which the plurality of movable bodies are authorized to travel upon, information relevant to a facility, and map information that is managed within a plurality of mesh-like grid regions of a map that includes at least the plurality of roads and the facility;
   a visit frequency calculator, implemented via the microprocessor, that calculates a visit frequency of each of the movable bodies of the plurality of moveable bodies visiting the facility on the basis of the position information of the plurality of movable bodies and the information relevant to the facility; and
   a movement route identification unit, implemented via the microprocessor, that identifies the plurality of movable bodies that visit the facility a designated plurality of times on the basis of the visit frequency of each of the movable bodies of the plurality of moveable bodies and, for each of the identified movable bodies, identifies a movement route from a start position to the facility on the basis of the position information and the information relevant to the road, thereby identifying the movement route of each of the plurality of movable bodies visiting the facility at least the designated plurality of times, wherein the movement route identification unit further increments a first counter value each time the movement route of each of the identified movable bodies of the plurality of moveable bodies to the facility is included within any particular mesh-like grid region of the plurality of mesh-like grid regions of the map, and increments a second counter value each time the movement route of each of the identified movable bodies of the plurality of moveable bodies to the facility is not included within any particular mesh-like grid region of the plurality of mesh-like grid regions of the map; and
wherein the analysis information reference device, includes:
   an analysis condition receiving unit, implemented via another microprocessor, that receives a desired analysis condition from a user, wherein the desired analysis condition includes visiting the facility at least the designated plurality of times; and
   a display that displays results associated with the desired analysis condition from the user by displaying an image of the map and the facility including at least one of the plurality of the mesh-like grid regions of the map, wherein each displayed mesh-like grid region of the plurality of the mesh-like grid regions of the map is indicative of the desired analysis condition for the corresponding mesh-like grid region, and wherein the displayed results further include each identified movement route for each displayed mesh-like grid region along with the first counter value divided by the sum of the first counter value and the second counter value, received from the movement route identification unit.

2. The information analysis system according to claim 1, wherein the movement route identification unit further:
identifies the start position of the plurality of movable bodies on the basis of the position information of the plurality of movable bodies,
determines whether or not the identified start position exists in a predetermined range from the facility on the basis of the identified start position and the information relevant to the facility, and
identifies the movement route of the plurality of movable bodies to the facility by dividing the movement route into an in-predetermined range and an out-of-predetermined range.

3. An information analysis system, comprising:
an information analysis device and an analysis information reference device which is connected to communicate with the information analysis device through a communication network, wherein the information analysis device includes:
   a receiving unit, implemented via a microprocessor including a timer, that receives position information of a plurality of movable bodies wherein the position information includes information indicating a position at a time when positioning is performed and the time when the positioning is performed;
   a storage unit, implemented via a memory, that stores information relevant to a plurality of roads which the plurality of movable bodies are authorized to travel upon, information relevant to a facility, and map information that is managed within a plurality of mesh-like grid regions of a map that includes at least the plurality of roads and the facility;

a visit frequency calculator, implemented via the microprocessor, that calculates a visit frequency of each of the movable bodies of the plurality of moveable bodies visiting the facility on the basis of the position information of the plurality of movable bodies and the information relevant to the facility; and a movement route identification unit, implemented via the microprocessor, that identifies the plurality of movable bodies of which the visit frequency to the facility is less than or equal to a predetermined number of times on the basis of the visit frequency of each of the movable bodies of the plurality of moveable bodies and, for each of the identified movable bodies, identifies a movement route from a start position to the facility on the basis of the position information and the information relevant to the road, thereby identifying the movement route of each of the plurality of movable bodies that has not visited the facility or has visited the facility less than the predetermined number of times or equal to the predetermined number of times if it has been beyond a predetermined duration from a current time since the movable body has last visited the facility, wherein the movement route identification unit further increments a first counter value each time the movement route of each of the identified movable bodies of the plurality of moveable bodies to the facility is included within any particular mesh-like grid region of the plurality of mesh-like grid regions of the map, and increments a second counter value each time the movement route of each of the identified movable bodies of the plurality of moveable bodies to the facility is not included within any particular mesh-like grid region of the plurality of mesh-like grid regions of the map; and wherein the analysis information reference device, includes:

an analysis condition receiving unit, implemented via another microprocessor, that receives a desired analysis condition from a user, wherein the desired analysis condition includes visiting the facility less than the predetermined number of times or equal to the predetermined number of times if it has been beyond a predetermined duration from a current time since the movable body has last visited the facility; and a display that displays results associated with the desired analysis condition from the user by displaying an image of the map including the facility including at least one of the plurality of the mesh-like grid regions of the map, wherein each displayed mesh-like grid region of the plurality of the mesh-like grid regions of the map is indicative of the desired analysis condition for the corresponding mesh-like grid region, and wherein the displayed results further include each identified movement route for each displayed mesh-like grid region along with the first counter value divided b the sum of the first counter value and the second counter value, received from the movement route identification unit.

4. An information analysis method performed by an information analysis system comprising an information analysis device and an analysis information reference device which is connected to communicate with the information analysis device through a communication network, the information analysis method comprising:

a method performed by the information analysis device and a method performed by the analysis information reference device, wherein the method performed by the information analysis device comprises:

receiving position information of a plurality of movable bodies wherein the position information includes information indicating a position at a time when positioning is performed and the time when the positioning is performed, from a timer;

storing information relevant to a plurality of roads which the plurality of movable bodies are authorized to travel upon, information relevant to a facility, and map information that is managed within a plurality of mesh-like grid regions of a map that includes at least the plurality of roads and the facility;

calculating a visit frequency of the plurality of movable bodies visiting the facility on the basis of the position information of the plurality of movable bodies and the information relevant to the facility;

identifying the plurality of movable bodies that visit the facility a designated plurality of times on the basis of the visit frequency of each of the movable bodies of the plurality of moveable bodies and, for each of the identified movable bodies, identifying a movement route from a start position to the facility on the basis of the position information and the information relevant to the road, thereby identifying the movement route of each of the plurality of movable bodies visiting the facility at least the designated plurality of times;

incrementing a first counter value each time the movement route of each of the identified movable bodies of the plurality of moveable bodies to the facility is include within any particular mesh-like grid region of the plurality of mesh-like grid regions of the map, and incrementing a second counter value each time the movement route of each of the identified moveable bodies of the plurality of moveable bodies to the facility is not included within any particular mesh-like grid region of the plurality of mesh-like grid regions of the map; and wherein the method performed by the analysis information reference device comprises:

receiving a desired analysis condition from a user, wherein the desired analysis condition includes visiting the facility at least the designated plurality of times; and displaying results associated with the desired analysis condition from the user on a display by displaying an image of the map including the facility and at least one of the plurality of the mesh-like grid regions of the map, wherein each displayed mesh-like grid region of the plurality of the mesh-like grid regions of the map is indicative of the desired analysis condition for the corresponding mesh-like grid region, and wherein displaying the results further includes each identified counter value divided by the sum of the first counter value and the second counter value, received from the information analysis device.

5. An information analysis method performed by an information analysis system comprising an information analysis device and an analysis information reference device which is connected to communicate with the information analysis device through a communication network, the information analysis method comprising:

a method performed by the information analysis device and a method performed by the analysis information reference device, wherein the method performed by the information analysis device comprises:

receiving position information of a plurality of movable bodies wherein the position information includes information indicating a position at a time when positioning is performed and the time when the positioning is performed, from a timer;

storing information relevant to a plurality of roads which the plurality of movable bodies are authorized to travel upon, information relevant to a facility, and map that includes at least the plurality of roads and the facility;

calculating a visit frequency of the plurality of movable bodies visiting the facility on the basis of the position information of the plurality of movable bodies and the information relevant to the facility;

identifying the plurality of movable bodies of which the visit frequency to the facility is less than or equal to a predetermined number of times and, for each of the plurality of identified movable bodies, identifying a movement route from a start position to the facility on the basis of the position information and the information relevant to the road, thereby identifying the movement route of each of the plurality of movable bodies that has visited the facility less than the predetermined number of times or equal to the predetermined number of times if it has been beyond a predetermined duration from a current time since the movable body has last visited the facility:

incrementing a first counter value each time the movement route of each of the identified movable bodies of the plurality of moveable bodies to the facility is included within any particular mesh-like grid region of the plurality of mesh-like grid regions of the map, and incrementing a second counter value each time the movement route of each of the identified movable bodies of the plurality of moveable bodies to the facility is not included within any particular mesh-like grid region of the plurality of mesh-like grid regions of the map; and wherein the method performed by the analysis information reference device comprises:

receiving a desired analysis condition from a user, wherein the desired analysis condition includes visiting the facility less than the predetermined number of times or equal to the predetermined number of times if it has been beyond a predetermined duration from a current time since the movable body has last visited the facility; and displaying results associated with the desired analysis condition from the user on a display by displaying an image of the map including the facility and at least one of the plurality of the mesh-like grid regions of the map, wherein each displayed mesh-like grid region of the plurality of the mesh-like grid regions of the map is indicative of the desired analysis condition for the corresponding mesh-like grid region, and wherein displaying the results further includes each identified movement route for each displayed mesh-like grid region along with the first counter value divided b the sum of the first counter value and the second counter value, received from the information analysis device.

\* \* \* \* \*